(12) United States Patent
Shim et al.

(10) Patent No.: US 9,682,503 B2
(45) Date of Patent: Jun. 20, 2017

(54) MOLD FOR MOLDING DECORATIVE OUTER PANEL OF REFRIGERATOR AND MANUFACTURING METHOD THEREOF

(71) Applicant: LG ELECTRONICS INC., Seoul (KR)

(72) Inventors: Jinwoo Shim, Changwon-si (KR);
Seokjae Jeong, Changwon-si (KR);
Youngkyu Kim, Changwon-si (KR);
Minkyu Hwang, Changwon-si (KR);
Seokki Hong, Changwon-si (KR)

(73) Assignee: LG ELECTRONICS INC., Seoul (KR)

( * ) Notice: Subject to any disclaimer, the term of this patent is extended or adjusted under 35 U.S.C. 154(b) by 457 days.

(21) Appl. No.: 14/359,911

(22) PCT Filed: Nov. 15, 2012

(86) PCT No.: PCT/KR2012/009691
§ 371 (c)(1),
(2) Date: May 21, 2014

(87) PCT Pub. No.: WO2013/077593
PCT Pub. Date: May 30, 2013

(65) Prior Publication Data
US 2014/0335218 A1    Nov. 13, 2014

(30) Foreign Application Priority Data

Nov. 21, 2011  (KR) .......................... 10-2011-0121383
Nov. 24, 2011  (KR) .......................... 10-2011-0123397

(Continued)

(51) Int. Cl.
*B29C 35/00*  (2006.01)
*B29C 45/26*  (2006.01)
(Continued)

(52) U.S. Cl.
CPC ............. *B29C 45/26* (2013.01); *B29C 33/38* (2013.01); *B29C 33/56* (2013.01);
(Continued)

(58) Field of Classification Search
CPC ......... B29C 45/73; B29C 45/26; B29C 45/34; B29C 33/56
See application file for complete search history.

(56) References Cited

FOREIGN PATENT DOCUMENTS

JP   H10-086191 A     4/1998
KR   10-2007-0009020 A  1/2007
(Continued)

OTHER PUBLICATIONS

International Search Report dated Mar. 19, 2013 issued in Application No. PCT/KR2012/009691.

*Primary Examiner* — Joseph S Del Sole
*Assistant Examiner* — John Robitaille
(74) *Attorney, Agent, or Firm* — KED & Associates, LLP

(57) ABSTRACT

Provided is a mold for molding a decorative outer panel of a refrigerator. A molding part is processed on a surface of the mold formed of a metal or engineering plastic material, but not formed of a glass material, to mold the decorative outer panel of a refrigerator having at least partial three-dimensional shape. Thus, the decorative outer panel having a three-dimensional shape or pattern may be formed through a simple process without performing a post-processing process.

17 Claims, 8 Drawing Sheets

(30) Foreign Application Priority Data

Nov. 24, 2011 (KR) .......................... 10-2011-0123406
Nov. 24, 2011 (KR) .......................... 10-2011-0123448

(51) Int. Cl.
*B29C 33/38* (2006.01)
*B29C 45/37* (2006.01)
*B29C 33/56* (2006.01)
*B29C 45/34* (2006.01)
*B29C 45/73* (2006.01)
*B29L 31/00* (2006.01)
*B29C 33/10* (2006.01)

(52) U.S. Cl.
CPC .......... *B29C 45/2608* (2013.01); *B29C 45/34* (2013.01); *B29C 45/372* (2013.01); *B29C 45/73* (2013.01); *B29C 33/10* (2013.01); *B29L 2031/7622* (2013.01)

(56) References Cited

FOREIGN PATENT DOCUMENTS

| | | |
|---|---|---|
| KR | 10-0894699 B1 | 4/2009 |
| KR | 10-0915150 B1 | 9/2009 |
| KR | 10-1066310 B1 | 9/2011 |

MOLD FOR MOLDING DECORATIVE OUTER PANEL OF REFRIGERATOR AND MANUFACTURING METHOD THEREOF

CROSS-REFERENCE TO RELATED PATENT APPLICATIONS

This application is a U.S. National Stage Application under 35 U.S.C. §371 of PCT Application No. PCT/KR2012/009691, filed Nov. 15, 2012, which claims priority to Korean Patent Application Nos. 10-2011-0123448 filed Nov. 24, 2011, 10-2011-0123406 filed Nov. 24, 2011, 10-2011-0123397 filed Nov. 24, 2011, and 10-2011-0121383 filed Nov. 21, 2011.

TECHNICAL FIELD

The present disclosure relates to a mold for molding a decorative outer panel of a refrigerator and a manufacturing method thereof.

BACKGROUND ART

In general, refrigerators are home appliances for storing foods at a low temperature state.

Such a refrigerator includes a main body defining a storage compartment and a door movably connected to the main body to open or close the storage compartment.

For example, the storage compartment may be partitioned into a refrigerating compartment and a freezing compartment. The door includes a refrigerating compartment door for opening or closing the refrigerating compartment and a freezing compartment door for opening or closing the freezing compartment. Thus, a user should open the freezing compartment door or the refrigerating compartment door to take foods stored in the refrigerating compartment or the freezing compartment out.

Also, in such a common refrigerator, a portion or the whole of an outer appearance of the refrigerator may be defined by a refrigerator door. Recently, a refrigerator in which a decorative outer panel having various textures and shapes is applied to the main body in addition to the refrigerator door is being spotlighted.

For example, a refrigerator in which a decorative outer panel having a metal texture may be provided on a front surface of the refrigerator, a decorative outer panel on which various patterns are printed is provided, or a front surface thereof is manufactured using an tempered glass or a transparent plastic material is being developed.

Specifically, in recent, a decorative outer panel having a flat plate shape may be provided on a front surface of a refrigerator door and a portion of a refrigerator main body to define an outer appearance of a refrigerator. Such a refrigerator is disclosed in Korean Patent Publication No. 10-2007-0032146.

Here, the decorative outer panel of the refrigerator may have a plate shape, and the decorative outer panel having the plate shape may be manufactured through a casting method which uses a glass plate as a mold. Hereinafter, a method for manufacturing a decorative outer panel of a refrigerator door using the casting method will be described.

FIG. 1 is a perspective view of a mold for manufacturing a decorative outer panel of a refrigerator according to a related art.

Referring to FIG. 1, a decorative outer panel 1 having a plate shape to define an outer appearance of a refrigerator door or a refrigerator main body may be manufactured through a casting method.

A mold 10 for molding the decorative outer panel 1 is constituted by an upper mold 11 and a lower mold 12. A gasket 13 is disposed between the upper mold 11 and the lower mold 12. Also, acrylic monomers which are a material for molding the decorative outer panel 1 may be injected into the mold 10.

Each of the upper mold 11 and the lower mold 12 may be formed of a glass material. This is done for a reason in which the upper and lower molds 11 and 12 should have a smooth surface such as a mirror surface because the decorative outer panel 1 should be smooth, like a glass surface.

The gasket 13 may be disposed around the lower mold 12. The gasket 13 may be formed of a soft PVC material. Also, the gasket 13 may have a shape corresponding to that of the decorative outer panel 1. That is, when the upper mold 11 and the lower mold 12 are coupled to each other, the acrylic monomers are injected into a space defined by the gasket 13. Thus, the decorative outer panel 1 may be molded according to the shape defined by the gasket 13.

Thus, the gasket 13 may be maintained always at a fixed position. For this, a fixing member 20 for fixing the gasket 13 is provided. The fixing member 20 may have a shape similar to tongs or a clamp. The fixing member 20 pushes the gasket 13 to fix the gasket to the lower mold 12.

The upper mold 11 has a size and shape corresponding to those of the lower mold 12. The upper mold 11 has a plane bottom surface. When the upper mold 11 and the lower mold 12 are coupled to each other, the bottom surface of the upper mold 11 contacts the gasket 13.

Thus, after the upper mold 11 and the lower mold 12 are coupled to each other, and then the acrylic monomers are injected into the space defined by the gasket 13, the coupled mold 10 may be polymerized using hot water and steam to mold the decorative outer panel 1.

However, the mold 10 according to the related art may have following limitations.

When the decorative outer panel 1 having the plate shape is molded, since the mold is formed of the glass material in the related art, the general flat-plate shaped decorative outer panel 1 having the smooth surface may be easily molded. However, since the mold 10 formed of the glass material can mold only the flat plate shape having the smooth surface. Thus, it is difficult to mold a decorative outer panel 1 having a three-dimensional pattern or shape on a surface thereof.

Also, when the decorative outer panel 1 is molded using the mold 10 according to the related art, the mold 10 in which the acrylic monomers that is a material for the polymerization and a polymerization initiator are injected is immersed in a hot water bath.

Thus, the hot water bath for the polymerization is heated up to a starting temperature and then is cooled. Also, these processes should be repeatedly performed. For this, the hot water bath should have a size enough to receive the whole mold 10, and the whole water contained in the hot water bath should be adjusted. Thus, fuel costs may be increased, and also, a cycle time may extend.

When the cycle time extends, productivity of the decorative outer wall 1 may be reduced.

Also, according to the related art, one mold 10 has no choice to mold only one decorative outer wall 1. Thus, to produce a plurality of decorative outer panel 1, the manufacturing process should be repeatedly performed as numerous as the number of decorative outer panel 1, or the mold 10 should be provided in number corresponding to the number of decorative outer panel 1. As a result, the productivity may be reduced.

In addition, since the mold for molding the decorative outer panel 1 is formed of the glass material, when the decorative outer panel 1 is mass-produced, a plurality of molds 10 are required. Thus, it may be difficult to manage the mold 10 formed of the glass material, and also, manufacturing costs may be increased.

DISCLOSURE OF INVENTION

Technical Problem

Embodiments provide a mold for molding a decorative outer panel of a refrigerator in which a molding part is processed on a surface of the mold formed of a metal or engineering plastic material, but a glass material, so that the decorative outer panel having a partial three-dimensional shape of the refrigerator is molded.

Embodiment also provide a mold for molding a decorative outer panel of a refrigerator in which a gasket is disposed between vertically divided molds, an acrylic monomer is injected into a molding space for decorative outer panel defined by the gasket, and a temperature adjustment device for adjusting a temperature of the mold is disposed in the mold.

Embodiments also provide a mold for molding a decorative outer panel of a refrigerator in which an upper mold, a lower mold, and at least one intermediate mold disposed between the upper mold and the lower mold are provided, a molding part for forming a three-dimensional shape on a surface of the decorative outer panel is disposed on each of the upper, lower, and the intermediate molds, and an acrylic monomer material is injected to mold a plurality of decorative outer panels at the same time.

Embodiments also provide a method of manufacturing a mold for molding a decorative outer panel of a refrigerator in which an engineering plastic material is injected into a master mold to manufacture a casting mold, and the casting mold for molding a decorative outer panel using an acrylic monomer through a casting method is continuously reduplicated.

Solution to Problem

In one embodiment, a mold for molding a decorative outer panel having a plate shape of a refrigerator by injecting an acrylic monomer material includes: an upper mold defining a portion of a cavity for molding the decorative outer panel; a lower mold disposed under the upper mold to correspond to each other, the lower mold being coupled to the upper mold to define a portion of the cavity; a molding part processed on an inner surface of the lower mold to form a roughness shape on the decorative outer panel; and a gasket disposed between the lower mold and the upper mold to prevent the acrylic monomer material from leaking, the gasket defining the cavity.

Each of the upper mold and the lower mold may be formed of a nonferrous metal material.

A top surface of the lower mold on which the molding part is provided and a bottom surface of the upper mold corresponding to the top surface of the lower mold may be sand-blasted to smoothly mirror-treat the surfaces of the lower mold and the upper mold.

The sand-blasted top surface of the lower mold and the sand-blasted bottom surface of the upper mold may be gloss-treated through a plating or deposition process.

A bottom surface of the upper mold may have a plane shape.

The decorative outer panel may have the plate shape to define front outer appearances of a door and a main body of the refrigerator.

An injection hole through which the acrylic monomer material and a polymerization initiator are injected and communicating with a space in which the decorative outer panel is molded may be defined in the mold.

A vent hole for exhausting air generated when the decorative outer panel is molded may be further defined in the mold.

The mold may further include a temperature adjustment device which circulates a heat transfer medium including water or oil is into the mold to adjust a temperature of the mold.

The temperature adjustment device may be defined by a plurality of passages horizontally passing through the mold.

The temperature adjustment device may be defined by a passage having an inlet and an outlet outside the mold and bent several times at a predetermined distance within the mold.

The mold may further include at least one intermediate mold successively stacked between the upper mold and the lower mold to mold a plurality of decorative outer panels above and below the intermediate mold at the same time, wherein the gasket may be disposed on the intermediate mold to define a space in which the acrylic monomer material is injected to mold the decorative outer panel, and a molding part which is cut to form a three-dimensional shape on the decorative outer panel, may be further disposed on the intermediate mold.

The molding part may be disposed on all of top and bottom surfaces of the intermediate mold.

At least one surface of a bottom of the upper mold and a top surface of the lower mold may have a plane shape.

Upper and lower molding parts which are processed in the same shape as the molding part may be further disposed on a bottom surface of the upper mold and a top surface of the lower mold.

Facing surfaces of the upper, intermediate, and lower molds may be sand-blasted.

The sand-blasted surfaces may be gloss-treated by a plating or deposition process.

In another embodiment, a method of manufacturing a mold for molding a decorative outer panel of a refrigerator by injecting an acrylic monomer material includes: processing a master mold formed of a metal material to form a casting mold; injecting an engineering plastic material into the master mold to form a casting mold; forming a metal plating layer on the casting mold; and plentifully reduplicating the casting mold using the master mold.

The casting mold may include an upper mold and a lower mold which are vertically disposed, and a space in which the decorative outer panel is molded may be formed by a gasket disposed between the upper mold and the lower mold.

The method may further include forming a pattern part processed in a shape corresponding to that of the master mold so that a molding part on which a three-dimensional pattern or shape to be formed on the decorative outer panel is formed is formed on the casting mold.

The pattern part may be formed in a roughness shape having a nano or micro size through an UV lithography method to form a hologram image using a fine pattern on a side of the decorative outer panel molded by the casting mold.

The master mold may be formed of a polyamide-based engineering plastic material.

The details of one or more embodiments are set forth in the accompanying drawings and the description below. Other features will be apparent from the description and drawings, and from the claims.

Advantageous Effects of Invention

According to the proposed embodiments, the mold for molding the decorative outer panel may be formed of the metal or engineering material, but not formed of the glass material, to process the molding part for forming the three-dimensional shape on the mold.

Thus, a hair line processing may be performed on the decorative outer panel of the refrigerator, or the decorative outer panel of the refrigerator having the three-dimensional pattern may be molded through the casting method. Thus, it may be unnecessary to perform the post-processing process. As a result, the decorative outer panel having the three-dimensional shape or pattern may be molded through a simple process.

Also, since the decorative outer panel having various shapes may be molded, the decorative outer panel which is not molded using an existing casting method may be molded to realize an outer appearance of the refrigerator having various shapes, thereby satisfying user's tastes.

Also, since the temperature adjustment device for adjusting a temperature of the mold is provided, the polymerization may be adjusted without using a water bath to reduce total installation costs.

Also, the temperature adjustment device may be disposed within the mold and have a simple structure using a cooling medium such as water or oil to reduce the installation and production costs.

Also, the quick and active temperature adjustment may be allowable by the polymerization to reduce a cycle time for producing the decorative outer panel. Thus, the productivity of the decorative outer panel may be improved.

Also, the plurality of intermediate molds may be further disposed between the upper mold and the lower mold to mold a plurality of decorative outer panels using one mold due to the plurality of intermediate molds. Specifically, since the intermediate mold may be provided in plurality, the desired number of decorative outer panel may be molded through only one process.

Thus, the manufacturing costs of the mold may be reduced, and the productivity of the decorative outer panel may be improved.

Also, according to the proposed embodiments, the casting mold for molding the decorative outer panel may be plentifully reduplicated by the metal master mold and formed of the engineering plastic material.

Thus, the casting mold may be formed of the engineering plastic material which is relatively easily managed than a glass to improve workability. Also, the plurality of casting molds may be manufactured using only one master mold to manufacturing the plurality of molds with relatively inexpensive costs.

Also, since the casting mold is formed of the engineering plastic material, the decorative outer panel having various shapes may be molded. Particularly, the three-dimensional shape or pattern may be formed on the decorative outer panel having the plate shape, and the processing for mounting the gasket may be easy.

Also, since the pattern part is formed on the master mold using the UV lithography method, the roughness having the nano or micro size may be transferred on the casting mold, and the hologram image may be transferred on the decorative outer panel through the molding part.

Thus, the decorative outer panel may be molded by the casting without performing a separate post-processing process. Also, while the decorative outer panel is molded, the hologram image may be formed on the surface of the decorative outer panel.

MODE FOR THE INVENTION

Hereinafter, exemplary embodiments will be described in detail with reference to the accompanying drawings. The spirit and scope of the present disclosure, however, shall not be construed as being limited to embodiments provided herein. Rather, it will be apparent that other embodiments that fall within the spirit and scope of the present disclosure may easily be derived through adding, modifying, and deleting elements herein.

A decorative outer panel according to embodiments is formed of an acrylic monomer. The decorative outer panel may define a front outer appearance of a refrigerator or include an outer component exposed to the outside such as one configuration, e.g., a drawer, a shelf, a basket, and the like which are disposed within the refrigerator and have plate shapes or wide surfaces such as a plate.

Figure 1:
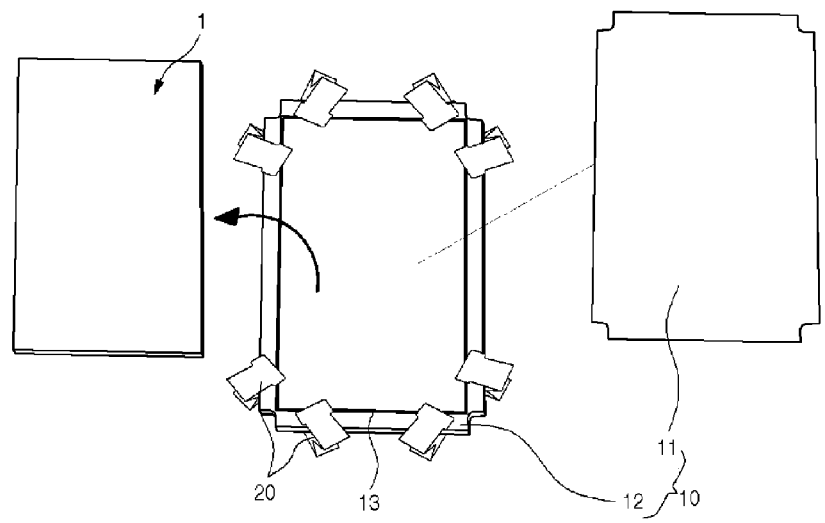
FIG. 1 is a perspective view of a mold for manufacturing a decorative outer panel of a refrigerator according to a related art.
Figure 2:
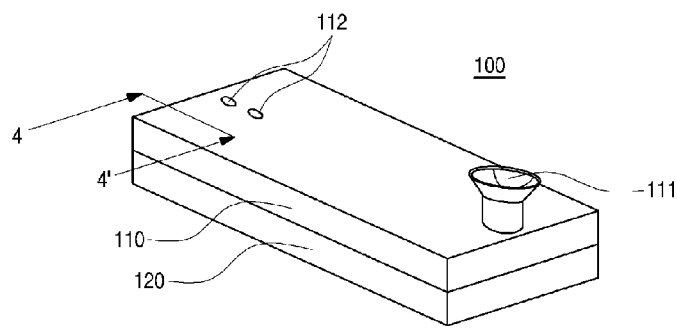
FIG. 2 is a perspective view of a mold for manufacturing a decorative outer panel of a refrigerator according to a first embodiment.
Figure 3:
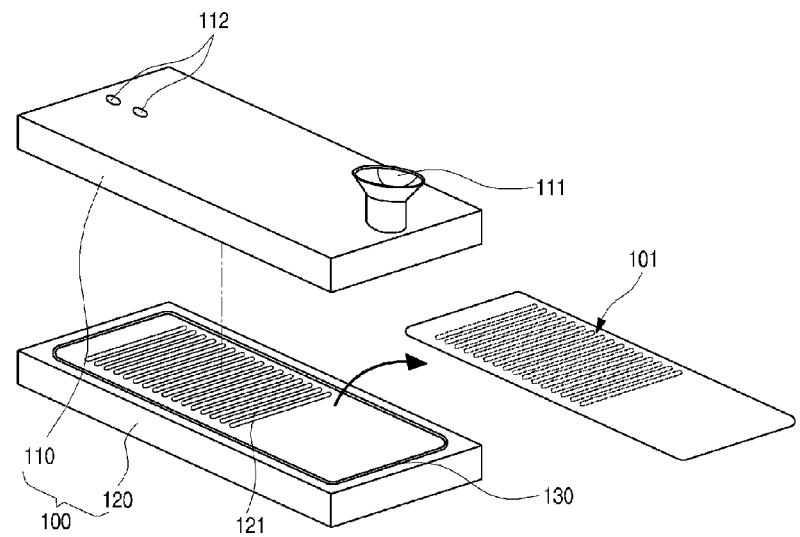
FIG. 3 is an exploded perspective view of the mold.
Figure 4:
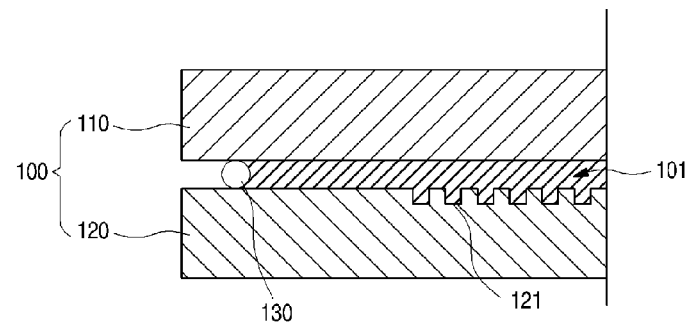
FIG. 4 is a cross-sectional view taken along line 2-2' of FIG. 2.

FIG. 2 is a perspective view of a mold for manufacturing a decorative outer panel of a refrigerator according to a first embodiment. FIG. 3 is an exploded perspective view of the mold. FIG. 4 is a cross-sectional view of the mold. Also, FIG. 4 is a cross-sectional view taken along line 2-2' of FIG. 2.

Referring to FIGS. 2 to 4, a decorative outer panel 101 molded by a mold 100 may have a plate shape to define an outer appearance of a door or main body of a refrigerator. Also, the decorative outer panel 101 may be formed of a plastic material such as acrylic. At least one portion of the decorative outer panel exposed to the outside may have a smooth shape. As necessary, the decorative outer panel 101 may be formed of a transparent or translucent material. Also, the decorative outer panel 101 may be directly printed, or a printed film may be attached to the decorative outer panel 101 to realize various colors and patterns.

A pattern such as a roughness may be provided on the decorative outer panel 101 to realize various textures. As necessary, a pattern for three-dimensionally realizing a specific shape may be provided on the decorative outer panel 101. The decorative outer panel 101 having the three-dimensional pattern may be molded by a casting method in which a material is injected into the molded mold 100.

In detail, the mold 100 is configured to mold the decorative outer panel 101 and includes an upper mold 110 and the lower mold 120. The mold 100 may be formed of a nonferrous metal material such as aluminum. Thus, when a polymerization process for molding the decorative outer panel 101 is performed, it may prevent the mold 100 from being rusted or corroded even though the mold 100 is cured within water. Thus, the mold 100 may be formed of an aluminum material so as to prevent it from being rusted and be easily handled.

A molding part 121 for three-dimensionally molding the decorative outer panel 101 may be disposed on the lower mold 120. In the current embodiment, the decorative outer panel 101 may be a plate shape. Also, a pattern having a three-dimensional shape may be disposed on a front surface of the decorative outer panel 101. Thus, the molding part 121 may be disposed on only the lower mold 120 of the upper and lower molds 110 and 120, and the upper mold 110 may have a plane shape.

The molding part 121 for three-dimensionally molding the decorative outer panel 101 is disposed on a side of the lower mold 120. To manufacture the molding part 121, the mold 100 formed of the metal material may be cut through NC working to manufacture the molding part 121. That is, the molding part 121 may be engraved or embossed in a shape to be molded through a lathe processing process.

The molding part 121 may be provided on the upper mold 110 in addition to the lower mold 120 according to a shape of the decorative outer panel 101. For example, when a component having a wide plate shape on the whole is molded, patterns may be respectively provided on front and back surfaces. Also, when the component has a three-dimensional shape, the molding part 121 may be provided on each of the upper and lower molds 110 and 120 to mold the three-dimensional component.

Like the decorative outer panel 101 according to the current embodiment, when the back surface is the plane shape, and the front surface has the three-dimensional pattern shape, the molding part 121 may be provided on only the lower mold 120 to mold the decorative outer panel 101 having the three-dimensional shape on the front surface thereof.

After the molding part 121 is formed, sand blasting may be performed on a surface through which the acrylic monomer is injected to mold the decorative outer panel 101. Thus, the molding part 121 and the lower mold 120 for molding the decorative outer panel 101 may have smooth top surfaces, respectively. Here, the sand blasting may be performed also on a bottom surface of the upper mold 110.

Also, a deposition or plating process may be performed on the molding part 121 and the top surface of the lower mold 120. Due to the deposition or plating process, the top surface of the lower mold 120 may have superior surface gloss, and the mold 100 may be increased in surface hardness.

Thus, the mold 100 may have improved durability, and the molded decorative outer panel 101 may be easily separated from the mold 100. In addition, the decorative outer panel 101 to be molded may have a smooth surface and superior surface gloss.

The same process which is performed on the top of the lower mold 120 may be performed on a bottom surface of the upper mold 110. Also, the other surface of the decorative outer panel 101 formed by the plating or deposition process may be smooth.

A gasket 130 may be disposed on the top surface of the lower mold 120. The gasket 130 may be formed of a soft PVC material. Also, when the upper mold 110 and the lower mold 120 are coupled to each other, the gasket 130 may be pushed and pressed by the upper mold 110.

The gasket 130 may prevent a material filled into the mold 100, i.e., the acrylic monomer from leaking. Also, the gasket 130 may have a predetermined height to define a space in which the decorative outer panel 101 is molded within the mold 100.

The gasket 130 may be disposed along a circumference of the lower mold 120. Also, the gasket 130 may have a shape corresponding to that of the decorative outer panel 101 to be molded. Thus, the gasket 130 may be disposed outside the molding part 121.

The gasket 130 may be fixed by a separate fixing member. As necessary, a fixing part for fixing the gasket 130 may be further disposed on the lower mold 120. Alternatively, the gasket 130 may be fixed without using the separate fixing member.

The gasket 130 may be mounted to complete the manufacture of the lower mold 120. Also, the bottom surface of the upper mold 110 coupled to the lower mold 120 may be mirror-treated through the sand blasting. Also, like the lower mold 120, the upper mold 110 may have a smooth surface through the deposition or plating process.

An injection hole 111 passing through the upper mold 110 is further defined in the upper mold 110 so that the material is injected into the space in which the decorative outer panel 101 is molded. The injection hole 111 may communicate with the inner space defined by coupling the lower mold 120 to the upper mold 110 to inject the material into the mold 110 therethrough. Although the material is injected from an upper side of the upper mold 110 in the current embodiment, the injection hole 111 may be variously changed in position and structure.

Also, a vent 112 for exhausting air when the material is injected through the injection hole 111 may be disposed in the upper mold 110. The injection hole 111 and the vent 112 may be opened or closed. Thus, when the mold 100 is received into a hot water bath or a steam chamber, the injection hole 111 and the vent may prevent moisture from being introduced.

Hereinafter, a method of molding the decorative outer panel 101 using the mold 100 having the above-described structure will be described in detail.

First, the lower mold 120 and the upper mold 110 are formed using an aluminum material, and then, the gasket 130 is disposed on the lower mold 120. Here, the gasket 130 may have a shape corresponding to that of the decorative outer panel 101.

That is, when the lower mold 120 and the upper mold 110 are coupled in a state where the gasket 130 is disposed, the gasket 130 may be pressed. Also, the gasket 130 is disposed between the lower mold 120 and the upper mold 110 to form a space therebetween. The space is provided as a space in which the decorative outer panel 101 is molded.

In the state where the lower mold 120 and the upper mold 110 are coupled to each other, the acrylic monomer that is a material for molding the decorative outer panel 101 is injected into the inner space of the mold 110 through the injection hole 111 formed in the upper mold 110. Here, the acrylic monomer may be injected together with a polymerization initiator. Also, the acrylic monomer and the polymerization initiator may be injected by an amount enough to fill the inner space of the mold 100.

The acrylic monomer and the polymerization initiator which are injected into the mold 100 are cured by the polymerization to complete the molding of the decorative outer panel 101. For this, the mold 100 in which the acrylic monomer is injected is immersed into a bath in which hot water having a temperature of about 80° C. is filled. The acrylic monomer is cured and hardened within the hot water bath. Also, the mold 100 is taken out of the hot water bath and received into the steam chamber. Then, the mold 100 is heat-treated by steam having a temperature of about 110° C. to complete the polymerization.

After the polymerization is completed, the mold 100 is cooled, and then, the upper and lower molds 110 and 120 are separated from each other. Then, the molded decorative outer panel 101 is separated from the mold 100. Since the upper and lower molds 110 and 120 have the smooth surfaces, the decorative outer panel 101 may be easily separated from the mold 100. Also, the decorative outer panel 101 may be automatically separated by a separate separation device.

After the decorative outer panel 101 is separated from the mold 100, the lower mold 120 and the upper mold 110 are coupled again to each other. Then, the acrylic monomer may be injected into the mold 100 to continuously mold the decorative outer panel 101.

Various embodiments in addition to the foregoing embodiment may be applied to the mold for molding the decorative outer panel of the refrigerator according to the embodiments.

According to a second embodiment, molding parts may be disposed on both sides of lower and upper molds to realize three-dimensional shapes on both side surfaces of a decorative outer panel.

Comparing the second embodiment with the foregoing embodiment, the manufacturing process except a position of a molding part are the same. Thus, descriptions related to the process for molding the decorative outer panel will be omitted.

Figure 5:
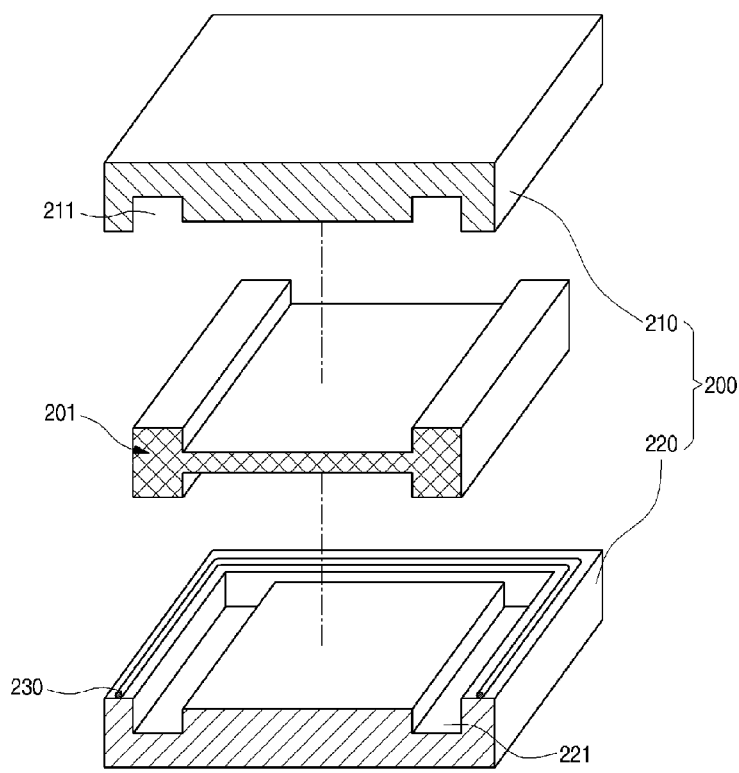
FIG. 5 is a partial exploded view of a mold for manufacturing a decorative outer panel of a refrigerator according to a second embodiment.

FIG. 5 is a partial exploded view of a mold for manufacturing a decorative outer panel of a refrigerator according to a second embodiment.

Referring to FIG. 5, to mold a refrigerator door or a decorative outer component 201 exposed to the outside of a refrigerator main body or the inside of a refrigerator, an acrylic monomer material and a polymerization initiator are injected into a mold 200.

The mold 200 includes an upper mold 210 and a lower mold 220. Each of the upper mold 210 and the lower mold 220 may be formed of a nonferrous metal such as aluminum. Also, molding parts 211 and 221 are disposed on inner surfaces of the upper and lower molds 210 and 220, respectively.

The molding parts 211 and 221 may be processed in a roughness shape on the inner surfaces of the upper and lower molds 210 and 220, respectively. Thus, the decorative outer component 201 may have a surface having a three-dimensional pattern shape.

Also, the decorative outer component 201 may have a curved shape according to the shapes of the molding parts 211 and 221. Alternatively, the decorative outer component 201 or a component provided within the refrigerator having a three-dimensional shape on the whole may be molded.

For this, the molding parts 211 and 221 may be cut so that they have shapes corresponding to those of the upper and lower molds 210 and 220, respectively. The acrylic monomer may be injected into a space defined when the upper mold 210 and the lower mold 220 are coupled to each other to mold the decorative outer component 201.

A gasket 230 may be disposed around the molding part 221 of the lower mold 220.

The gasket 230 may prevent the acrylic monomer from leaking in the state where the acrylic monomer is injected after the upper and lower molds 210 and 220 are coupled to each other.

Various embodiments in addition to the foregoing embodiment may be applied to the mold for molding the decorative outer panel of the refrigerator according to the embodiments.

According to a third embodiment, a temperature adjustment device for adjusting a temperature of the mold is disposed within the mold. Thus, it may be unnecessary to provide a bath required for performing the casting method, and a simple structure using a cooling medium may be provided. As a result, equipment and producing costs may be reduced.

Figure 6:
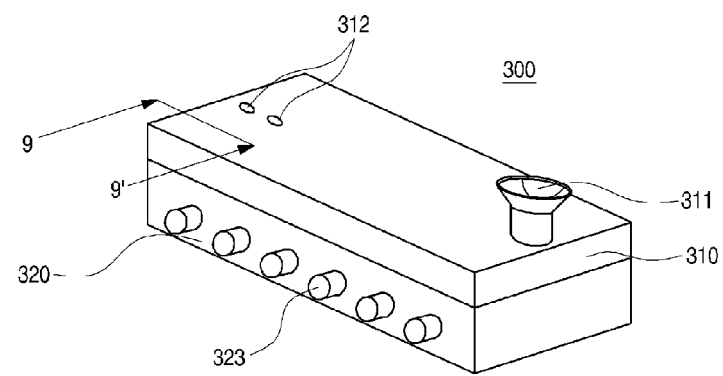
FIG. 6 is a perspective view of a mold for manufacturing a decorative outer panel of a refrigerator according to a third embodiment.
Figure 7:
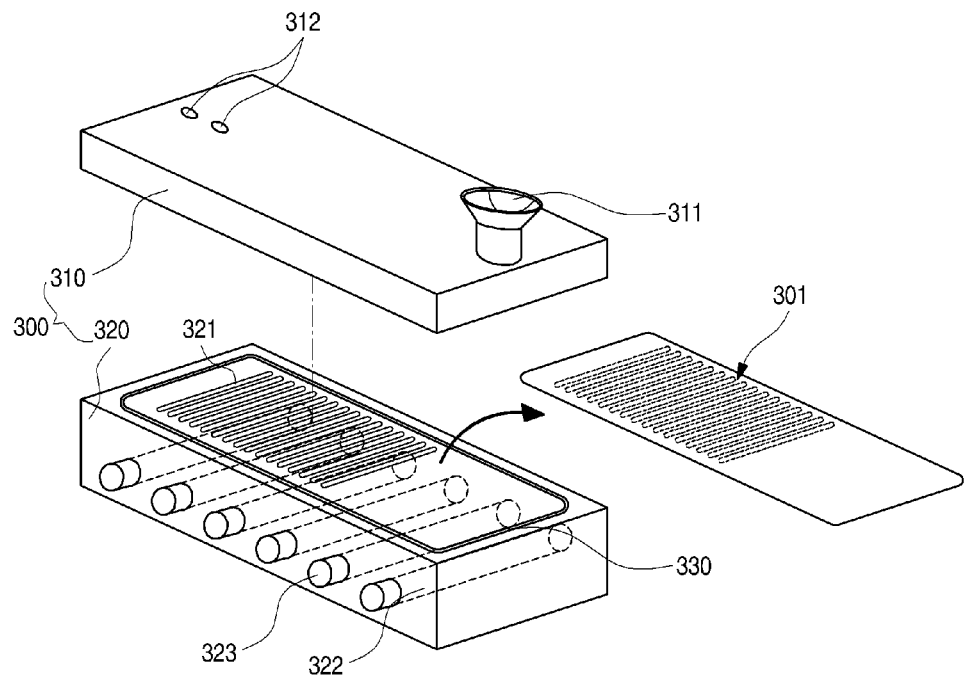
FIG. 7 is an exploded perspective view of the mold.
Figure 8:
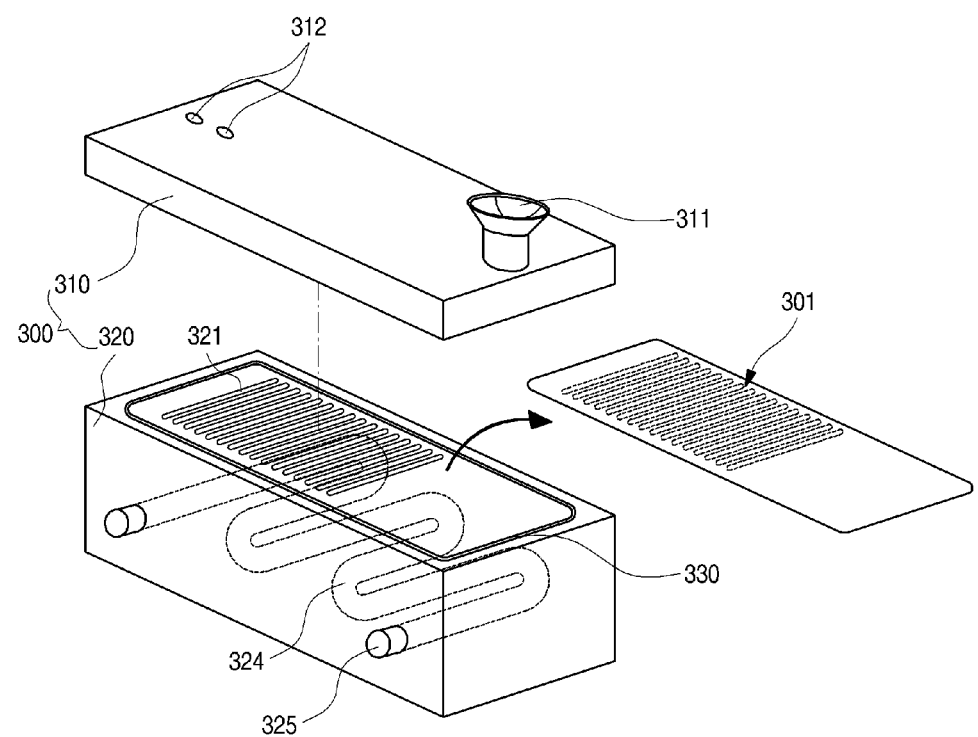
FIG. 8 is an exploded perspective view illustrating a modified structure of a temperature adjustment part within the mold.
Figure 9:
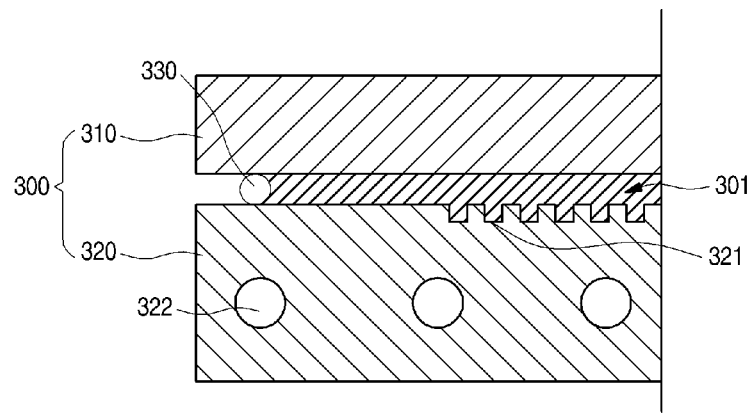
FIG. 9 is a cross-sectional view taken along line 9-9' of FIG. 6.

FIG. 6 is a perspective view of a mold for molding a decorative outer panel of a refrigerator according to a third embodiment. FIG. 7 is an exploded perspective view of the mold. FIG. 8 is an exploded perspective view illustrating a modified structure of a temperature adjustment part within the mold. Also, FIG. 9 is a cross-sectional view taken along line 9-9' of FIG. 6.

Referring to FIGS. 6 to 9, a decorative outer panel 301 molded by a mold 300 according to the current embodiment may have a plate shape to constitute a refrigerator door or define an outer appearance of a main body of a refrigerator. Also, the decorative outer panel 301 may be formed of a plastic material such as acrylic. At least one portion of the decorative outer panel exposed to the outside may have a smooth shape. As necessary, the decorative outer panel 301 may be formed of a transparent or translucent material. Also, the decorative outer panel 101 may be directly printed, or a printed film may be attached to the decorative outer panel 101 to realize various colors and patterns.

A pattern such as a roughness may be provided on the decorative outer panel 301 to realize various textures. As necessary, a pattern for three-dimensionally realizing a specific shape may be provided on the decorative outer panel 301. The decorative outer panel 301 having the three-dimensional pattern may be molded by a casting method in which a material is injected into the molded mold 300.

In detail, the mold 300 is configured to mold the decorative outer panel 301 and includes an upper mold 310 and the lower mold 320. The mold 300 may be formed of a nonferrous metal material such as aluminum. Thus, when a polymerization process for molding the decorative outer panel 301 is performed, it may prevent the mold 300 from being rusted or corroded even though the mold 300 is cured within water. Thus, the mold 300 may be formed of an aluminum material so as to prevent it from being rusted and be easily handled.

The upper mold 310 is disposed at the uppermost portion of the mold 300, and the lower mold 320 is disposed at the lowermost of the mold 300. The upper mold 310 and the lower mold 320 are coupled in a staked form. When the upper and lower molds 310 and 320 are coupled to each other, a space in which the decorative outer panel 301 is molded may be defined by a gasket disposed between the upper mold 310 and the lower mold 320. Thus, an acrylic monomer is injected into the space defined within the mold 300, and then polymerization is performed to mold the decorative outer panel 301.

A molding part 321 for three-dimensionally molding the decorative outer panel 301 may be disposed in the space between the upper mold 310 and the lower mold 320. In the current embodiment, the decorative outer panel 301 may be a plate shape. Also, a pattern having a three-dimensional shape may be disposed on a front surface of the decorative outer panel 101. Thus, the molding part 321 is disposed on only a top surface of the lower mold 320, and a bottom of the upper mold 310 has a plane shape.

The molding part 321 is configured to form a three-dimensional pattern on the decorative outer panel 301. To form the molding part 321, the mold 300 formed of a metal material may be cut through NC working. That is, the molding part 321 may be engraved or embossed in a shape to be molded through a lathe processing process.

A remaining portion except the portion at which the molding part 321 is formed may have a plane shape. After the molding part 321 is formed, sand blasting may be performed on a surface through which the acrylic monomer is injected to mold the decorative outer panel 301. Thus, the molding part 321 and the lower mold 320 for molding the decorative outer panel 301 may have smooth top surfaces, respectively.

Also, a deposition or plating process may be performed on the molding part 321 and the top surface of the lower mold 320. Due to the deposition or plating process, facing surfaces of the upper and lower molds 310 and 320 may have superior surface gloss, and the mold may be increased in surface hardness.

Thus, the mold 300 may have improved durability, and the molded decorative outer panel 301 may be easily separated from the mold 100. In addition, the decorative outer panel 301 to be molded may have a smooth surface and superior surface gloss.

Also, the plating or depositing process may be performed also on the bottom surface of the upper mold 310 corresponding to the top surface of the lower mold 320 after the sand blasting is performed. Thus, the upper mold 310 may have the smooth bottom surface.

As necessary, in a case where only one surface of the decorative outer panel 301 is smooth, the sand blasting and plating or deposition process may be performed on the top surface of the lower mold 320. Also, a separate process may not be performed on the bottom surface of the upper mold 310.

A gasket 330 may be disposed outside the molding part 321. The gasket 330 may be formed of a soft PVC material. Also, when the lower mold 320 and the upper mold 310 are stacked and coupled to each other, the gasket 130 may be pushed and pressed.

The gasket 330 may prevent a material filled into the mold 300, i.e., the acrylic monomer from leaking. Also, the gasket 330 may have a predetermined height to define a space in which the decorative outer panel 301 is molded within the mold 300.

The gasket 330 may be disposed along a circumference of the lower mold 320. Also, the gasket 330 may have a shape corresponding to that of the decorative outer panel 301 to be molded. Thus, the gasket 330 may be disposed outside the molding part 321.

The gasket 330 may be disposed on a surface on which the molding part 321 is formed. The gasket 330 is disposed around the molding part 321. This is done for a reason in which a gasket slot for fixing the gasket 330 is formed together with the molding part 321.

A temperature adjustment device may be disposed under the lower mold 320. The temperature adjustment device may adjust a temperature of the mold 300 to perform the polymerization of the acrylic monomer material. The temperature adjustment device may be provided as a passage 322 passing through the lower mold 320.

In detail, the passage 322 may pass through the lower mold 320 from a left side toward a right side. Alternatively, the passage 322 may be continuously provided in plurality at a predetermined interval. The passage 322 may be disposed over the lower mold 320. A tube 323 may be connected to an end of the passage 322 to continuously circulate a heat transfer medium such as water or oil therethrough.

As shown in FIG. 8, the passage 324 is opened at a lateral portion of the lower mold 320. Also, the passage 322 may be repeatedly bent at a predetermined distance within the lower mold 320. Thus, when the heat transfer medium such as water or oil is injected through the opened side of the passage 324, the heat transfer medium may be discharged through the other side of the lower mold 320 via the whole surface of the lower mold 320. As described above, the heat transfer medium may be continuously circulated into the passage 324 to adjust the temperature of the lower mold 320.

A tube 325 may be inserted into the passage 324 to manufacture the temperature adjustment device. The temperature adjustment device may be configured to allow the heat transfer medium to flow through the tube 325. The passage 324 may have various shapes or structures. However, the passage 324 should have a structure in which the heat transfer medium flows into the lower mold 320 to heat and cool the lower mold 320.

An injection hole 311 and a vent hole 312 may be further defined in the upper mold 310. The injection hole 311 is opened at a top surface of the upper mold 310 to serve as a passage for injecting the acrylic monomer. The injection hole 311 passes through the upper mold 310 and is opened downward. Also, the injection hole 311 may communicate with a space in which the decorative outer panel 301 is disposed.

The vent hole 312 is spaced apart from the injection hole 311 and defined in the top surface of the upper mold 310. Also, the vent hole 312 communicates with the space in which the decorative outer panel 301 is disposed to discharge air generated when the acrylic monomer is injected or the polymerization is performed.

Hereinafter, a method of molding the decorative outer panel 301 using the mold 300 having the above-described structure will be described in detail.

Figure 10:
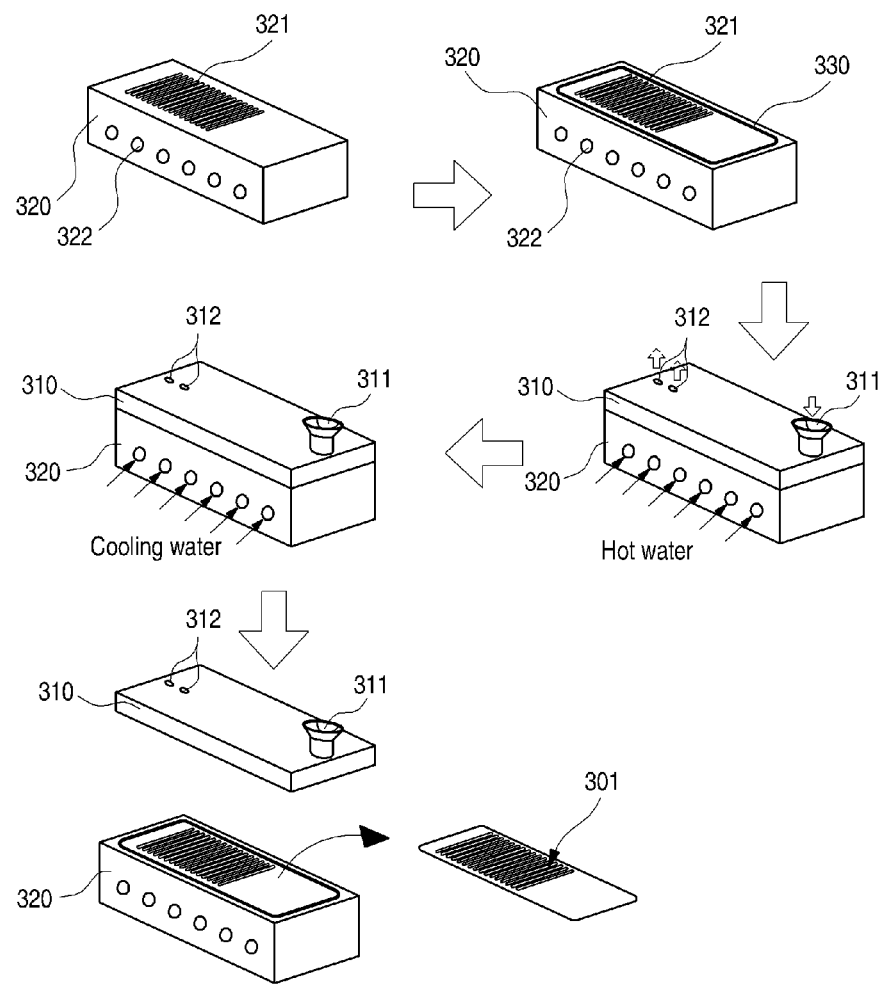
FIG. 10 is a view illustrating a process of molding the mold and the decorative outer panel.

FIG. 10 is a view illustrating a process of molding the mold and the decorative outer panel.

First, a metal material such as aluminum is molded in a size corresponding to that of the upper mold 310 or lower mold 320.

The passage 322 is formed in the lower mold 320. The lower mold 320 may be formed using a casting method to form the passage 322. As necessary, the lower mold 320 may be vertically separated, and the passage 322 may be formed through a cutting process. Then, the separated lower molds 320 are coupled to form the whole shape. The tube 323 may be inserted into or connected to the passage 322 so that water or heat transfer medium flows.

In this state, the cutting process is performed on the top surface of the lower mold 320 to form the molding part 321. Here, the gasket slot may be formed at the same time through the cutting process.

That is, when the cutting process is performed, the whole top surface of the lower mold 320 may be processed, and thus, the molding part 321 and the gasket slot may be formed at the same time.

After the molding part 321 and the gasket slot are formed in the top surface of the lower mold 320, sand blasting may be performed on the top surface of the lower mold 320 to trim a surface of the lower mold 320. Then, the plating or deposition process may be performed so that the lower mold 320 has a smooth top surface such as a mirror.

After the top surface of the lower mold 320 is processed, the gasket 330 is inserted into the gasket slot. The gasket 330 is inserted along the gasket slot may be mounted on the top surface of the lower mold 320 to protrude somewhat from the top surface of the lower mold 320. Also, in the state where the gasket 330 is completely mounted, the gasket 330 has a close loop shape to form a space therein.

Also, like the lower mold 320, the sand blasting and the plating or deposing processes may be performed also on the bottom surface of the upper mold 310 so that the upper mold 310 has a smooth bottom surface such as a mirror surface. Thus, the acrylic monomer may be injected to form a smooth surface within the space in which the decorative outer panel 301 is formed. As a result, the whole surface of the decorative outer panel 301 may be smooth, and also, the decorative outer panel 301 may be easily separated from the mold 300.

After the lower mold 320 and the upper mold 310 are formed using the aluminum material, the gasket 330 is disposed on the lower mold 320. Here, the gasket 330 may have a shape corresponding to that of the decorative outer panel 301.

That is, when the lower mold 320 and the upper mold 310 are coupled in a state where the gasket 330 is disposed, the gasket 330 may be pressed. Also, the gasket 330 is disposed between the lower mold 320 and the upper mold 310 to form a space therebetween. The space is provided as a space in which the decorative outer panel 301 is molded.

As described above, in a state where the molding of the decorative outer panel 301 is prepared, a heat transfer medium such as water or oil for heating is injected through the tube 323 and the passage 322. The heat transfer medium injected into the lower mold 320 is circulated along the lower mold 320 to heat the lower mold 320. Thus, the lower mold 320 may be heated at a starting temperature for the polymerization.

In the state where the lower mold 320 and the upper mold 310 are coupled to each other, when the mold 300 is heated to a temperature of about 60° C. to about 80° C., the acrylic monomer that is a material for molding the decorative outer panel 301 is injected into the inner space of the mold 300 through the injection hole 311 formed in the upper mold 310. Here, the acrylic monomer may be injected together with a polymerization initiator. Also, the acrylic monomer may be injected by an amount enough to fill the inner space of the mold 300.

The acrylic monomer and the polymerization initiator are injected into the mold 300, and then, the polymerization occurs to generate heat. Thus, to performing the continuous polymerization, when a set time (about 90 minutes) elapses, the heat transfer medium such as water or oil for cooling the mold 300 is injected through the passage 322 and the tube 323.

The heat transfer medium may be injected to quickly cool the mold 300. Thus, the mold 300 may be cooled to adjust a content of the polymerization initiator or a cross-linking agent, thereby adjusting a cycle time of the polymerization.

The acrylic monomer and the polymerization initiator which are injected into the mold 300 are cured by the polymerization to complete the molding of the decorative outer panel 301.

After the polymerization is completed, the mold 300 is cooled, and then, the upper and lower molds 310 and 320 are separated from each other. Then, the molded decorative outer panel 301 is separated from the mold 300. Since the upper and lower molds 310 and 320 have the smooth surfaces, the decorative outer panel 300 may be easily separated from the mold 300. Also, the decorative outer panel 301 may be automatically separated by a separate separation device.

After the decorative outer panel 301 is separated from the mold 300, the lower mold 320 and the upper mold 310 are coupled to each other. Then, the mold 300 may be heated, and the acrylic monomer may be injected into the mold 301. Thereafter, the mold 300 may be cooled again to continuously mold the decorative outer panel 301.

Various embodiments in addition to the foregoing embodiment may be applied to the mold for molding the decorative outer panel of the refrigerator according to the embodiments.

In a fourth embodiment, an upper mold, a lower mold, and at least one intermediate mold disposed between the upper mold and the lower mold are provided. A molding part for forming a three-dimensional shape on a surface of a decorative outer panel is disposed on each of the upper mold, the lower mold, and the intermediate mold. Also, an acrylic monomer material may be injected to mold a plurality of decorative outer panels at the same time.

Figure 11:
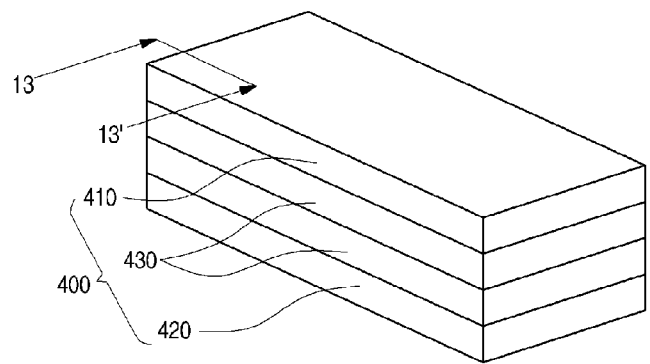
FIG. 11 is a perspective view of a mold for manufacturing a decorative outer panel of a refrigerator according to a fourth embodiment.
Figure 12:
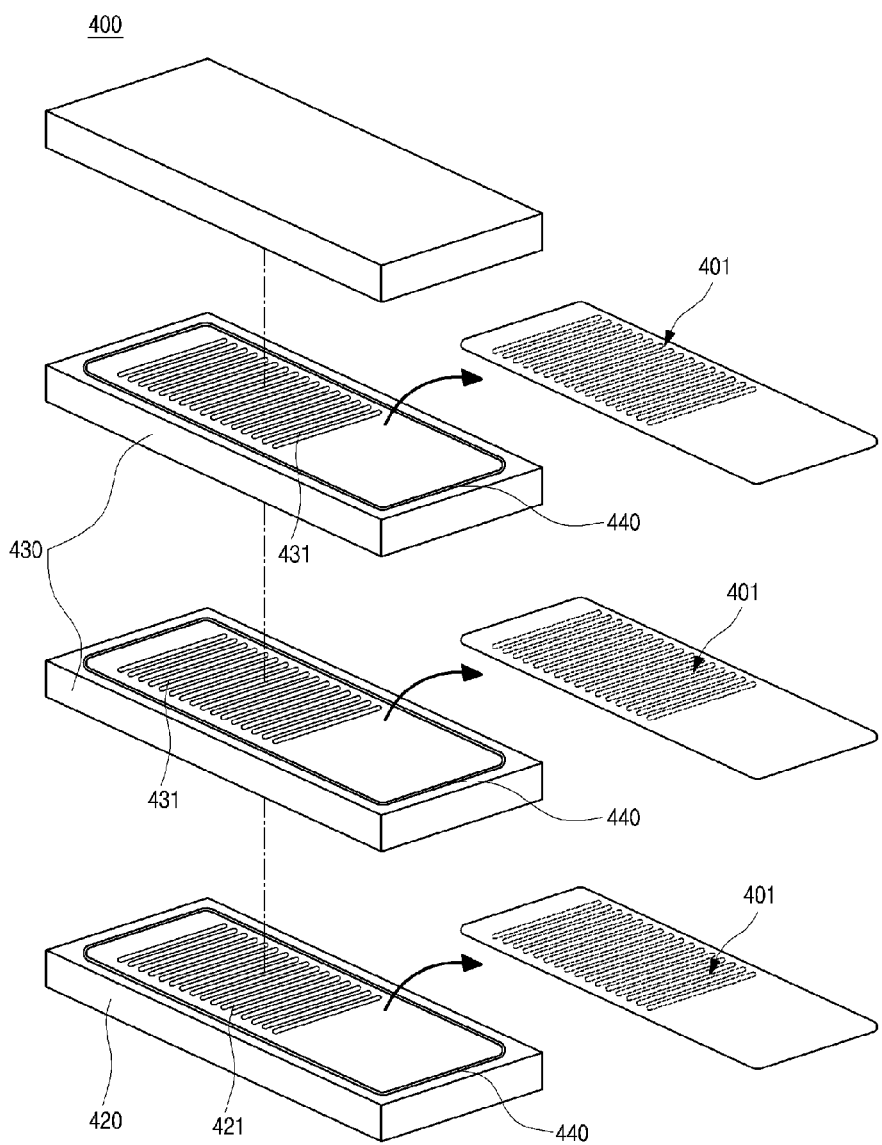
FIG. 12 is an exploded perspective view of the mold.
Figure 13:
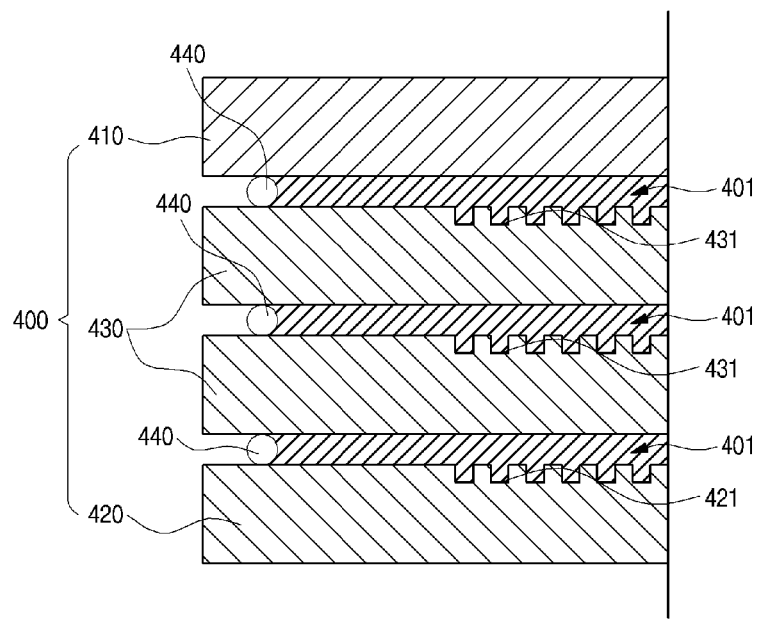
FIG. 13 is a cross-sectional view taken along line 13-13' of FIG. 11.

FIG. 11 is a perspective view of a mold for manufacturing a decorative outer panel of a refrigerator according to a fourth embodiment. FIG. 12 is an exploded perspective view of the mold. FIG. 13 is a cross-sectional view taken along line 13-13' of FIG. 11.

Referring to FIGS. 11 to 13, a decorative outer panel 401 molded by a mold 400 may have a plate shape to define an outer appearance of a door or main body of a refrigerator. Also, the decorative outer panel 401 may be formed of a plastic material such as acrylic. At least one portion of the decorative outer panel exposed to the outside may have a smooth shape. As necessary, the decorative outer panel 401 may be formed of a transparent or translucent material. Also, the decorative outer panel 401 may be directly printed, or a printed film may be attached to the decorative outer panel 401 to realize various colors and patterns.

A pattern such as a roughness may be provided on the decorative outer panel 401 to realize various textures. As necessary, a pattern for three-dimensionally realizing a specific shape may be provided on the decorative outer panel 401. The decorative outer panel 401 having the three-dimensional pattern may be molded by a casting method in which a material is injected into the molded mold 400.

In detail, the mold 400 is configured to mold the decorative outer panel 401 and includes an upper mold 410, a lower mold 420, and an intermediate mold 430. The mold 400 may be formed of a nonferrous metal material such as aluminum. Thus, when a polymerization process for molding the decorative outer panel 401 is performed, it may prevent the mold 400 from being rusted or corroded even though the mold 400 is cured within water. Thus, the mold 400 may be formed of an aluminum material so as to prevent it from being rusted and be easily handled.

The upper mold 410 is disposed at the uppermost portion of the mold 400, and the lower mold 420 is disposed at the lowermost of the mold 400. Also, the intermediate mold 430 may be disposed between the upper mold 410 and the lower mold 420. Here, the intermediate mold 430 may be provided in plurality. Also, the plurality of intermediate molds 430 may be stacked on each other. Also, the uppermost intermediate mold 430 of the plurality of intermediate molds 430 may be coupled to the upper mold 410, and the lowermost intermediate mold 430 of the plurality of intermediate molds 430 may be coupled to the lower mold 420.

The upper mold 410, the lower mold 420 and the intermediate mold 430 are coupled in a stacked configuration. Also, a space in which the decorative outer panel 401 is molded may be defined between the molds. That is, an acrylic monomer is injected into the space defined within the mold 400, and then, the polymerization is performed to mold the decorative outer panel 401.

Since the space is defined between the upper mold 410 and the intermediate mold 430 and between the intermediate mold 430 and the lower mold 420, the number of decorative outer panel 401 may be decided according to the number of upper, lower, and intermediate molds 410, 420, and 430.

A molding part 421 for three-dimensionally molding the decorative outer panel 401 may be disposed in the space between the upper mold 410, the lower mold 420, and the intermediate mold 430. In the current embodiment, the decorative outer panel 401 may be a plate shape. Also, a pattern having a three-dimensional shape may be disposed on a front surface of the decorative outer panel 401. Thus, the molding part 420 is disposed on only each of top surfaces of the lower and intermediate molds 420 and 430. Each of bottoms of the lower, intermediate, and upper molds 420, 430, and 410 has a plane shape.

The molding parts 421 and 431 are configured to form a three-dimensional pattern on the decorative outer panel 401. To form the molding parts 421 and 431, the mold 400 formed of a metal material may be cut through NC working. That is, the molding parts 421 and 431 may be engraved or embossed in a shape to be molded through a lathe processing process.

Each of remaining portions except the portions at which the molding parts 421 and 431 are disposed may have a plane shape. After the molding parts 421 and 431 are formed, sand blasting may be performed on a surface through which the acrylic monomer is injected to mold the decorative outer panel 401. Thus, the molding parts 421 and 431 and the upper, lower, and intermediate molds 410, 420, and 430 for molding the decorative outer panel 401 may have smooth surfaces, respectively.

Also, deposition or plating processes may be performed on the molding parts 421 and 431 and the surfaces of the upper, lower, and intermediate molds 410, 420, and 430. Due to the deposition or plating process, each of the surfaces of the upper, lower, and intermediate molds 410, 420, and 430 may have superior surface gloss, and the mold may be increased in surface hardness.

Thus, the mold 400 may have improved durability, and the molded decorative outer panel 401 may be easily separated from the mold 400. In addition, the decorative outer panel 401 to be molded may have a smooth surface and superior surface gloss.

As necessary, in a case where only one surface of the decorative outer panel 401 is smooth, the sand blasting and plating or deposition process may be performed on only a surface of the upper, lower, and intermediate molds 430 corresponding to the smooth surface of the decorative outer panel 401.

A gasket 440 may be disposed outside the molding parts 421 and 431. The gasket 440 may be formed of a soft PVC material. Also, when the lower mold 420 and the intermediate mold 430 are stacked and coupled to each other, the gasket 440 may be pushed and pressed.

The gasket 440 may prevent a material filled into the mold 400, i.e., the acrylic monomer from leaking. Also, the gasket 440 may have a predetermined height to define a space in which the decorative outer panel 401 is molded within the mold 400.

The gasket 440 may be disposed along a circumference of each of the lower and intermediate molds 420 and 430. Also, the gasket 440 may have a shape corresponding to that of the decorative outer panel 401 to be molded. Thus, the gasket 440 may be disposed outside the molding parts 421 and 431.

The gasket 440 may be disposed on each of surfaces on which the molding parts 421 and 431 are formed. The gasket 440 may be disposed around each of the molding parts 421 and 431. This is done for a reason in which a gasket slot for fixing the gasket 440 is formed together with the molding parts 421 and 431.

That is, although the gasket 440 is provided on each of the top surfaces of the lower and intermediate molds 420 and 430 in the current embodiment, the gasket 400 may be disposed on the upper, lower, and intermediate molds 410, 420, and 430 according to positions of the molding parts 421 and 431.

As described above, the gasket 440 may be mounted to complete the manufacture of the lower mold 420.

Hereinafter, a method of molding the decorative outer panel 401 using the mold 400 having the above-described structure will be described in detail.

First, the lower mold 420, the upper mold 410, and the intermediate mold 430 are formed using an aluminum material, and then, the gasket 440 is disposed on each of the top surfaces of the lower and intermediate molds 420 and 430. Here, the gasket 440 may have a shape corresponding to that of the decorative outer panel 401.

Here, the number of intermediate mold 430 is decided according to the number of decorative outer panel 401 to be molded. Although the intermediate mold 430 is provided in only one, the decorative outer panel 401 may be provided in two. Also, if the intermediate mold 430 is provided in two, the decorative outer panel 401 may be provided in four.

The number of continuously couplable intermediate mold 430 may be decided according to the number of decorative outer panel 401. Also, the number of intermediate mold 430 may be decided according to a size of a hot water bath or steam chamber in which the mold 400 is received.

When the lower mold 420, the intermediate mold 430, and the upper mold 410 are successively stacked and coupled in the state where the gasket 440 is disposed, the gaskets 440 may be pressed. Also, the gaskets 440 disposed between the lower, intermediate, and upper molds 420, 430, and 410 to form a space therebetween. The space is provided as a space in which the decorative outer panel 401 is molded.

When the lower, intermediate, and upper molds 410, 430, and 410 are coupled to each other, the acrylic monomer that is a material for molding the decorative outer panel 401 may be injected. In the state where the lower mold 420 is disposed, the acrylic monomer and a polymerization initiator for the polymerization are injected by a preset amount into the space above the top surface of the lower mold 420 defined by the gasket 440.

In this state, when the intermediate mold 430 is stacked on the lower mold 420, the gasket 440 is pressed to couple the lower mold 420 to the intermediate mold 430. Thus, the space in the decorative outer panel 401 is molded is sealed.

Also, the acrylic monomer and the polymerization initiator are injected into the space defined by the gasket 440 disposed on the top surface of the stacked intermediate mold 430, and then the intermediate mold 430 is stacked. When the acrylic monomer and the polymerization initiator are injected and the intermediate mold 430 is stacked, the acrylic monomer and the polymerization initiator are injected again into the space above the top surface of the uppermost intermediate mold 430, and the upper mold 410 is stacked. Thus, the injection of the acrylic monomer and the polymerization initiator and the coupling of the mold 400 are completed.

If an injection hole for injecting the acrylic monomer and the polymerization initiator is provided in the mold 400, the acrylic monomer and the polymerization initiator may be injected through the injection hole.

The acrylic monomer and the polymerization initiator which are injected into the mold 400 are cured by the polymerization to complete the molding of the decorative outer panel 401. For this, the mold 400 in which the acrylic monomer is injected is immersed into a bath in which hot water having a temperature of about 80° C. is filled. The acrylic monomer is cured and hardened within the hot water bath. Also, the mold 400 is taken out of the hot water bath and received into the steam chamber. Then, the mold 400 is heat-treated by steam having a temperature of about 110° C. to complete the polymerization.

After the polymerization is completed, the mold 400 is cooled, and then, the upper, intermediate, and lower molds 410, 430, and 420 are separated from each other. Then, the molded decorative outer panel 401 is separated from the mold 400. Here, at least two decorative outer panels 401 may be manufactured at the same time using at least one intermediate mold 430 through one process.

Since the upper and lower molds 410 and 420 have the smooth surfaces, the decorative outer panel 401 may be easily separated from the mold 400. Also, the decorative outer panel 401 may be automatically separated by a separate separation device.

After the decorative outer panel 401 is separated from the mold 400, the lower mold 420, the intermediate mold 430, and the upper mold 410 are coupled again to each other.

Then, the acrylic monomer and the polymerization initiator may be injected into the mold 400 to continuously mold the decorative outer panel 401.

In the above-described structure of the mold 400, a plurality of decorative outer panels 401 may be manufactured at the same time through only one process.

Various embodiments except the foregoing embodiment may be applied to the mold for molding the decorative outer panel of the refrigerator according to the current embodiment.

According to another embodiment, molding parts may be disposed on lower, intermediate, and upper molds to realize three-dimensional shapes on both side surfaces of a decorative outer panel.

Comparing another embodiment with the fourth embodiment, the manufacturing process except a position of a molding part are the same. Thus, descriptions related to the process for molding the decorative outer panel will be omitted.

Figure 14:
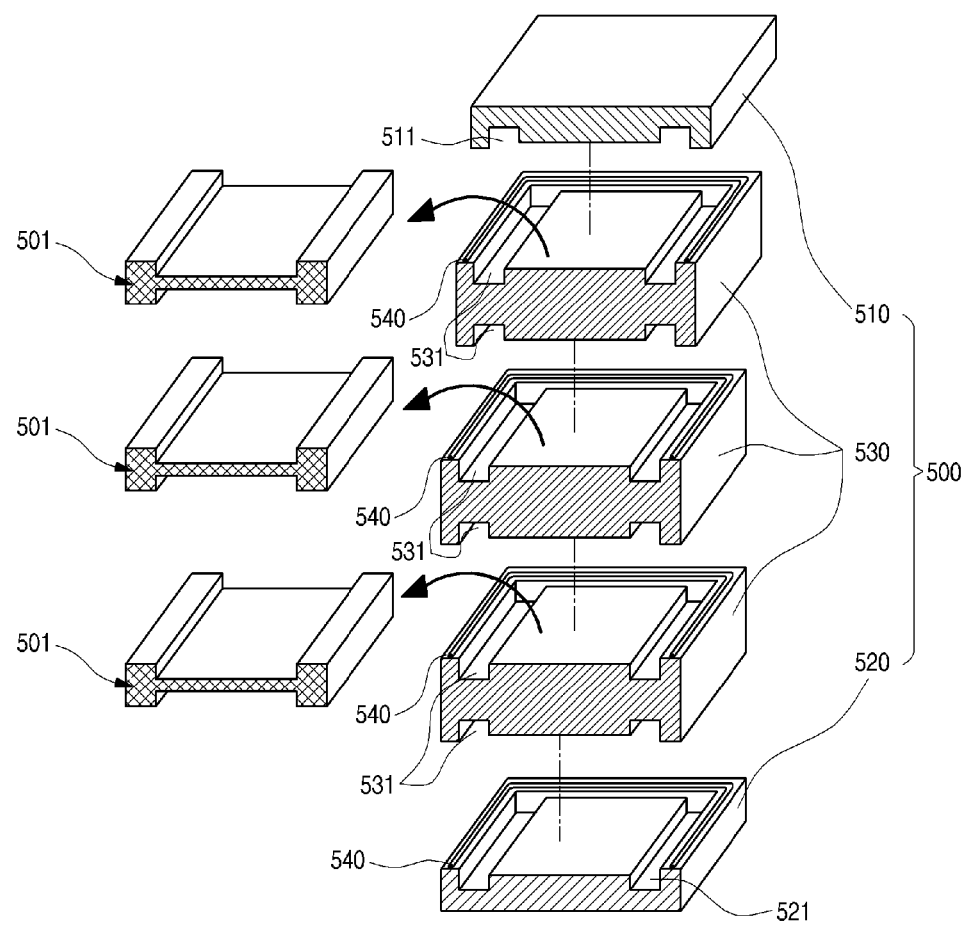
FIG. 14 is a partial exploded view of a mold for manufacturing a decorative outer panel of a refrigerator according to a fifth embodiment.

FIG. 14 is a partial exploded view of a mold for manufacturing a decorative outer panel of a refrigerator according to a fifth embodiment.

Referring to FIG. 14, to mold a refrigerator door or a decorative outer component 501 exposed to the outside of a refrigerator main body or the inside of a refrigerator, an acrylic monomer material and a polymerization initiator are injected into a mold 500.

The mold 500 includes an upper mold 510, a lower mold 520, and at least one intermediate mold 530. Each of the upper mold 530, the lower mold 520, and the intermediate mold 530 may be formed of a nonferrous metal such as aluminum. Also, molding parts 511, 521, and 531 are disposed on the upper, lower, and intermediate molds 510, 520, and 530, respectively.

The molding parts 511, 521, and 531 may be processed in a roughness shape on a bottom surface of the upper mold 510, a top surface of the lower mold 520, and both top and bottom surfaces of the intermediate mold 530 to form patterns on the surfaces of each of decorative outer components 501.

Also, the decorative outer component 501 may have a curved shape according to the shapes of the molding parts 511, 521, and 531. Alternatively, the decorative outer component 501 or a component provided within the refrigerator having a three-dimensional shape on the whole may be molded.

For this, the molding parts 511, 521, and 531 may be cut so that they have shapes corresponding to those of the upper, lower, and intermediate molds 510, 520, and 530, respectively. The acrylic monomer and a polymerization initiator may be injected into a space defined when the upper mold 510, the lower mold 520, and the intermediate mold 530 are coupled to each other to mold the decorative outer component 501.

A gasket 540 may be disposed around each of the molding parts 511, 521, and 531 between the lower mold 520, the upper mold 510, and the intermediate mold 530. The gasket 540 may prevent the acrylic monomer and the polymerization initiator from leaking in the state where the acrylic monomer and the polymerization initiator are injected after the upper, lower and intermediate molds 510, 520, and 530 are coupled to each other.

The plurality of decorative outer components may be molded at the same time through only one process by the mold 500 having the above-described structure.

Various embodiments in addition to the foregoing embodiment may be applied to the mold for molding the decorative outer panel of the refrigerator according to the embodiments.

According to a sixth embodiment, a mold for molding a decorative outer panel of a refrigerator is formed of an engineering plastic material. Also, the engineering plastic material is injected into a master mold processed using a metal material to manufacture a casting mold. Then, the casting mold for molding the decorative outer panel using an acrylic monomer through a casting method may be continuously reduplicated.

Figure 15:
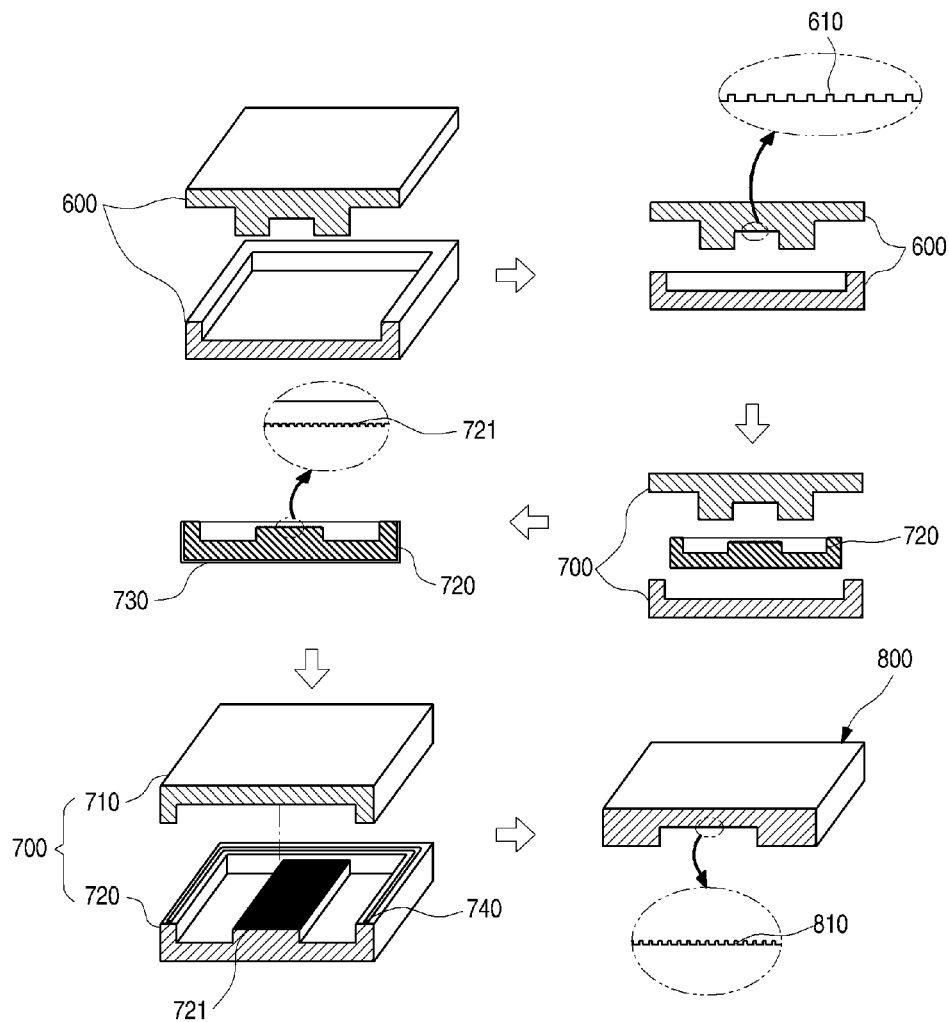
FIG. 15 is a view illustrating a process of manufacturing a mold for molding a decorative outer panel of a refrigerator according to a sixth embodiment.
Figure 16:
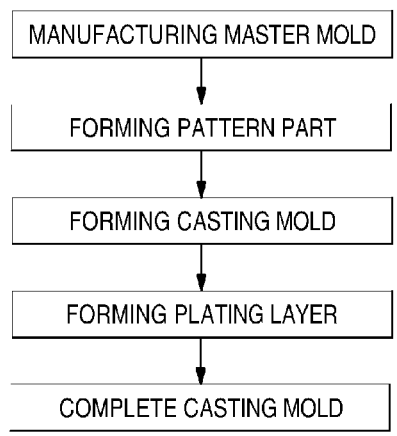
FIG. 16 is a block diagram illustrating the process of manufacturing the mold for molding the decorative outer panel of the refrigerator.

FIG. 15 is a view illustrating a process of manufacturing a mold for molding for manufacturing a decorative outer panel of a refrigerator according to a sixth embodiment. FIG. 16 is a block diagram illustrating the process of manufacturing the mold for molding the decorative outer panel of the refrigerator.

Referring to FIGS. 15 and 16, a decorative outer panel 800 molded by a casting mold 700 according to the current embodiment may have a plate shape or a wide surface similar to the plate shape. The decorative outer panel 800 includes refrigerator components which are molded using an acrylic monomer by the casting method, such as a component mounted on a door and a refrigerator main body to define an outer appearance of a refrigerator, components constituting a drawer, a shelf, a basket, and the like which are exposed to the inside of the refrigerator.

The decorative outer panel 800 may be molded using the acrylic monomer. Also, at least portion, which is exposed to the outside, of the decorative outer panel 800 may have a smooth shape. The decorative outer panel 800 may be formed of a transparent or translucent material. Also, the decorative outer panel 401 may be directly printed, or a printed film may be attached to the decorative outer panel 800 to realize various colors and patterns.

A pattern such as a roughness may be provided on the decorative outer panel 800 to realize various textures. As necessary, a pattern for three-dimensionally realizing a specific shape may be provided on the decorative outer panel 401. The decorative outer panel 800 having the three-dimensional pattern may be molded by the casting method in which a material is injected into a formed casting mold 700. Also, a hologram image having a nano-sized roughness may be transferred into the decorative outer panel 800 from the casting mold 700.

Hereinafter, a process of manufacturing the casting mold 700 for molding the decorative outer panel 800 and a process of manufacturing the decorative outer panel 800 will be described.

To form the casting mold 700, a master mold 600 is processed. The master mold 600 is configured to plentifully reduplicating the casting mold 700. The master mold 600 is formed of a metal material. The master mold 600 may have a shape corresponding to that of the casting mold 700 so that a material is injected into the master mold 600 to receive the casting mold 700.

The master mold 600 may be constituted by an upper mold and a lower mold. The master mold 600 has a space in which an engineering plastic material that is a material for the casting mold 700 is injected. Thus, after the master mold 600 is assembled, the engineering plastic material is injected to form the casing mold 700.

A pattern part 610 that will be described in detail below is formed inside the master mold 600. The pattern part 610 of the master mold 600 may have a roughness shape having a nano or micro unit. When the casting mold 700 is formed, a molding part 721 is formed on a position corresponding to that of the casting mold 700.

Thus, the pattern part 610 of the master mold 600 forms the molding part 721 of the casting mold 700. Also, the pattern part 610 may be transferred to correspond to a surface of the decorative outer panel 800 by the molding part 721. Here, the roughness shape formed on the surface of the decorative outer panel 800 constitutes projections, each having a nano or micro unit. Thus, a hologram image 810 may be formed by reflecting light without performing a separate processing process. Its detailed description will be described below.

The engineering plastic material injected to form the casting mold 700 may use a polyamide-based engineering plastic having superior thermal deformation characteristics. The engineering plastic may have heat resistance and superior strength and deformation and size stability against heat. Thus, the engineering plastic may be used for the casting method in which the acrylic monomer is used as a material.

The casting mold 700 may be provided in plurality. At least two casting molds 700 may be provided according to a shape of the decorative outer panel 800. The at least two casting molds 700 are vertically stacked on each other to form a space in which the decorative outer panel 800 is molded.

Thus, in a case where an upper mold 710 and a lower mold 720 constituting the casting mold 700 have different shapes, master molds 600 having shapes corresponding to those of the upper mold 710 and the lower mold 720 are manufactured. On the other hand, in a case where the upper mold 710 and the lower mold 720 have the same shape, the casting mold 700 is formed using one master mold 600.

The casting mold 700 formed in the master mold 600 is formed of the engineering plastic material. The surface of the formed casting mold 700 is plated using a metal material through a deposition method.

Thus, the plating process is performed to form a metal layer 730 on the surface of the casting mold 700. Specifically, the metal layer 730 is formed on the molding part 721 and a portion in which the space in which the decorative outer panel 800 is molded. Thus, when the material for molding the decorative outer panel 800 is injected, it may prevent the material from chemically reacting.

In detail, since the engineering plastic is formed of a plastic material, when an acrylic monomer that is a raw material of the decorative outer panel 800 is injected, the casting mold 700 and the raw material may contact each other. As a result, the chemical reaction may occur, and thus, it is difficult to smoothly perform the molding of the decorative outer panel 800.

Thus, since the metal layer 730 is formed on an outer surface of the casting mold 700 through the plating process, the acrylic monomer material does not directly contact the engineering plastic, but contacts the metal layer 730 to prevent the casting mold 700 from chemically reacting with the material.

Also, since the metal layer 730 is formed on the surface of the casting mold 700, the surface of the casting mold 700 may be smooth. As a result, the molded decorative outer panel 800 may also have a smooth surface. Thus, it is unnecessary to perform a separate surface post-processing process. Also, since the casting mold 700 has the smooth surface, the decorative outer panel 800 may be easily separated after it is molded.

As described above, the plating process is performed to form the metal layer 730 on the casting mold 700. Then, a gasket 740 is mounted on the casting mold 700 to form the casting mold 700.

The formed casting mold 700 is constituted by an upper mold 710 and a lower mold 720. The upper mold 710 and the lower mold 720 are vertically stacked and coupled to each other. Also, when the upper mold 710 and the lower mold 720 are coupled to each other, the space in which the decorative outer panel 800 is molded may be formed by the gasket 740 disposed between the upper mold 710 and the lower mold 720. Thus, the acrylic monomer is injected into the space formed within the casting mold 700, and then polymerization is performed to mold the decorative outer panel 800.

A molding part 721 for three-dimensionally molding the decorative outer panel 800 may be disposed in the space between the upper mold 710 and the lower mold 720. The pattern part 610 formed on the master mold 600 may be transferred to form the molding part 721. When the decorative outer panel 800 is molded, a hologram image displayed on the decorative outer panel 800 may be formed.

Hereinafter, a process of forming the hologram image on the decorative outer panel will be described with reference to the accompanying drawings.

Figure 17:
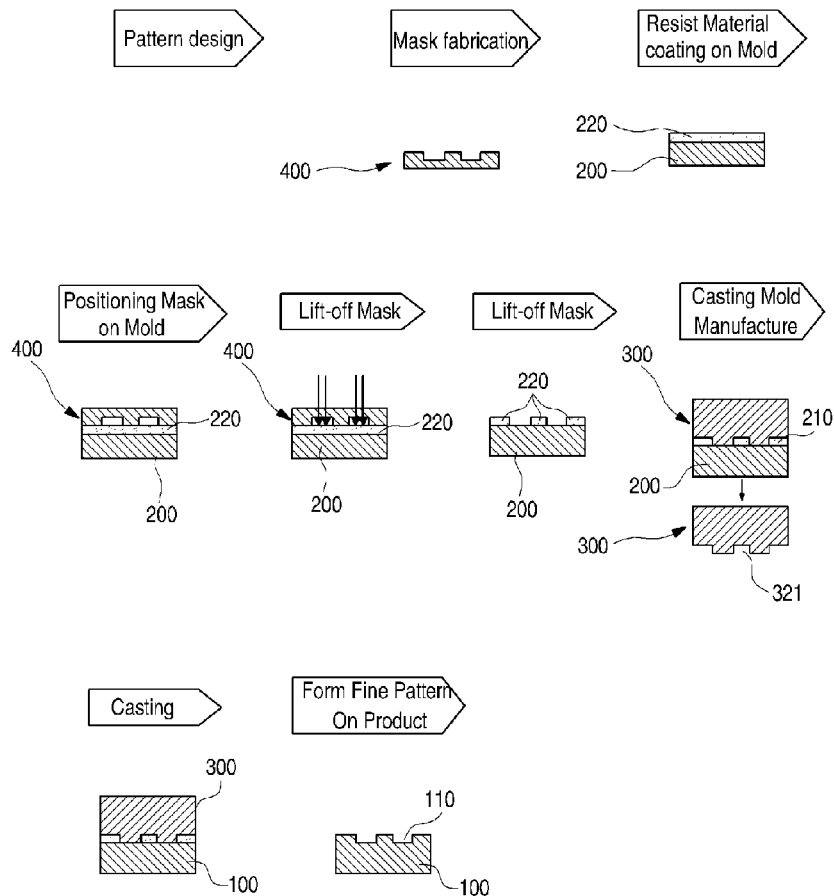
FIG. 17 is a view illustrating a process of forming a hologram image on the decorative outer panel.
Figure 18:
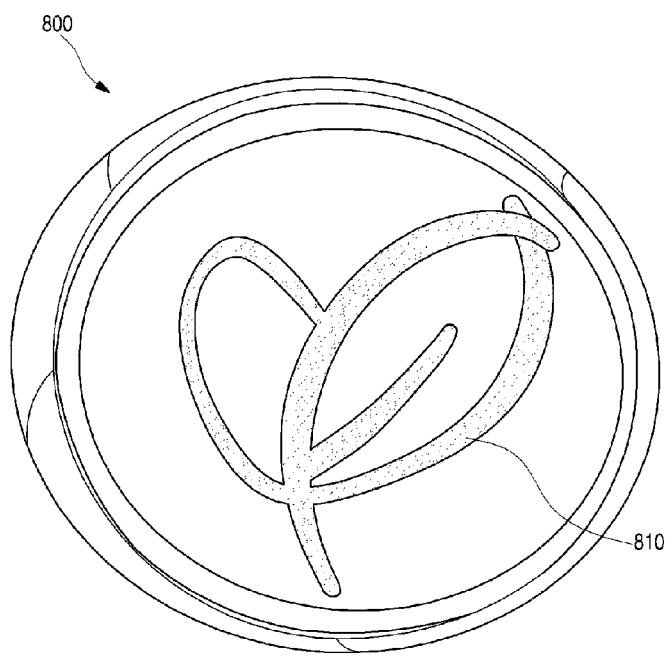
FIG. 18 is a view of the molded decorative outer panel.

FIG. 17 is a view illustrating a process of forming a hologram image on the decorative outer panel. FIG. 18 is a view of the molded decorative outer panel.

Referring to FIGS. 17 and 18, when the master mold 600 is formed, the pattern part 610 is processed on the surface of the master mold 600 through a UV lithography method to form the molding part 721 on the casting molding 700.

To process the pattern part 610, a pattern to be formed is designed first. The pattern designed on the pattern part 610 may be formed on the master mold 600. Finally, the hologram image may be formed on the surface of the decorative outer panel 800.

After the pattern is designed, a mask 900 is manufactured on the basis of the designed pattern. When an UV ray is radiated onto the mask 900, the UV ray may be selectively radiated onto the master mold 600. A photoresister (PR) coating layer 620 is formed on a side of the master mold 600 for forming the pattering part 610 while the mask 900 is manufactured. After a PR material is applied to form the PR coating layer, the formed mask 900 is disposed on the master mold 600. Here, the formed mask 900 is disposed on the PR coating layer 620 applied to the master mold 600.

After the mask 900 is disposed on the master mold 600, the UV ray is radiated onto the mask 900 from an upper side of the mask 900. The UV ray may be radiated to etch a portion which is not covered by the mask 900. In this state, the radiation of the UV ray is completed, the mask 900 is removed. When the mask 900 is removed, a fine roughness is formed on the surface of the master mold 600 to complete the forming of the pattern part 610. Here, the formed pattern has the fine roughness having a nano unit or micro unit.

To form the casting mold 700 on the master mold 600 on which the pattern part 610 is formed, the engineering plastic is injected into the master mold 600 to form the casting mold 700. Here, the molding part 721 may be transferred on a side of the casting mold 700 corresponding to the pattern part 610 of the master mold 600. The molding part 721 has a shape corresponding to that of the pattern part 610.

When the forming of the casting mold 700 is completed, the upper mold 710 and the lower mold 720 of the casting mold 700 are assembled. Then, the acrylic monomer and the polymerization initiator may be injected to mold the decorative outer panel 800.

The fine pattern may be transferred on the surface of the decorative outer panel 800 by the casting mold 700. The fine pattern may form the hologram image 810 having the same shape of the pattern part 610 formed on the master mold 600. The hologram image 810 is constituted by roughness shapes having nano or micro sizes. Also, the hologram image 810 may have an effect similar to a hologram by the reflection of light. Thus, as shown in FIG. 5, the decorative outer panel 800 having the hologram image 810 may be molded.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

INDUSTRIAL APPLICABILITY

According to the embodiments.

The invention claimed is:

1. A mold for molding a decorative outer panel having a plate shape of a refrigerator by injecting an acrylic monomer material, the mold comprising:
    an upper mold defining a portion of a cavity for molding the decorative outer panel;
    a lower mold disposed under the upper mold to correspond to each other, the lower mold being coupled to the upper mold to define a portion of the cavity;
    a molding part processed on an inner surface of the lower mold to form a roughness shape on the decorative outer panel; and
    a gasket disposed between the lower mold and the upper mold to prevent the acrylic monomer material from leaking, the gasket defining the cavity.

2. The mold according to claim 1, wherein each of the upper mold and the lower mold is formed of a nonferrous metal material.

3. The mold according to claim 1, wherein a top surface of the lower mold on which the molding part is provided and a bottom surface of the upper mold corresponding to the top surface of the lower mold are sand-blasted to smoothly mirror-treat the surfaces of the lower mold and the upper mold.

4. The mold according to claim 3, wherein the sand-blasted top surface of the lower mold and the sand-blasted bottom surface of the upper mold are gloss-treated through a plating or deposition process.

5. The mold according to claim 1, wherein a bottom surface of the upper mold has a plane shape.

6. The mold according to claim 1, wherein the decorative outer panel has the plate shape to define front outer appearances of a door and a main body of the refrigerator.

7. The mold according to claim 1, wherein an injection hole through which the acrylic monomer material and a polymerization initiator are injected and communicating with a space in which the decorative outer panel is molded is defined in the mold.

8. The mold according to claim 1, wherein a vent hole for exhausting air generated when the decorative outer panel is molded is further defined in the mold.

9. The mold according to claim 1, further comprising a temperature adjustment device which circulates a heat transfer medium including water or oil is into the mold to adjust a temperature of the mold.

10. The mold according to claim 9, wherein the temperature adjustment device is defined by a plurality of passages horizontally passing through the mold.

11. The mold according to claim 9, wherein the temperature adjustment device is defined by a passage having an inlet and an outlet outside the mold and bent several times at a predetermined distance within the mold.

12. The mold according to claim 1, further comprising at least one intermediate mold successively stacked between the upper mold and the lower mold to mold a plurality of decorative outer panels above and below the intermediate mold at the same time, wherein the gasket is disposed on the intermediate mold to define a space in which the acrylic monomer material is injected to mold the decorative outer panel, and a molding part which is cut to form a three-dimensional shape on the decorative outer panel, is further disposed on the intermediate mold.

13. The mold according to claim 12, wherein the molding part is disposed on all of top and bottom surfaces of the intermediate mold.

14. The mold according to claim 12, wherein at least one surface of a bottom of the upper mold and a top surface of the lower mold has a plane shape.

15. The mold according to claim 13, wherein upper and lower molding parts which are processed in the same shape as the molding part are further disposed on a bottom surface of the upper mold and a top surface of the lower mold.

16. The mold according to claim 12, wherein facing surfaces of the upper, intermediate, and lower molds are sand-blasted.

17. The mold according to claim 16, wherein the sand-blasted surfaces are gloss-treated by a plating or deposition process.

* * * * *